United States Patent
Park

(10) Patent No.: US 10,431,147 B2
(45) Date of Patent: Oct. 1, 2019

(54) DC-DC CONVERTER WITH SLAVE OPERATION DURING HIGH INPUT VOLTAGE

(71) Applicant: Samsung Display Co., Ltd., Yongin-Si, Gyeonggi-Do (KR)

(72) Inventor: Sungchun Park, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/865,903

(22) Filed: Jan. 9, 2018

(65) Prior Publication Data

US 2018/0233078 A1 Aug. 16, 2018

(30) Foreign Application Priority Data

Feb. 14, 2017 (KR) .......................... 10-2017-0020095

(51) Int. Cl.
  *H02M 3/158* (2006.01)
  *G09G 3/30* (2006.01)
  (Continued)

(52) U.S. Cl.
  CPC ................. *G09G 3/30* (2013.01); *G09G 3/20* (2013.01); *H02M 1/36* (2013.01); *H02M 3/158* (2013.01); *H02M 3/1584* (2013.01); *G09G 2320/029* (2013.01); *G09G 2330/021* (2013.01); *G09G 2330/028* (2013.01); *H02M 2001/008* (2013.01);
  (Continued)

(58) Field of Classification Search
  CPC ......... H02M 3/1584; H02M 2001/009; H02M 2001/0077; H02M 2001/0022
  See application file for complete search history.

(56) References Cited

U.S. PATENT DOCUMENTS 7,728,568 B1 * 6/2010 Jain .......................... H02M 1/15
                                                                 323/272
2012/0293562 A1 * 11/2012 Park ...................... G09G 3/3233
                                                                 345/690

(Continued)

FOREIGN PATENT DOCUMENTS

| KR | 1020130037053 A | 4/2013 |
| KR | 1020160021956 A | 2/2016 |
| KR | 1020160053124 A | 5/2016 |

*Primary Examiner* — Harry R Behm
(74) *Attorney, Agent, or Firm* — Cantor Colburn LLP

(57) ABSTRACT

A DC-DC converter includes: a first converter including a pass transistor coupled between the first node and a first output, and a body diode connected in parallel to the pass transistor; a sensor coupled between both ends of the pass transistor and which detects a driving current; and a second converter which outputs a second power voltage lower than the first power voltage to a second output. The second converter includes a master inverting converter which outputs the second power voltage independently of the driving current, a slave inverting converter which outputs the second power voltage when the driving current is greater than a predetermined threshold or when the input power voltage is greater than a predetermined boosting voltage limit, and an inverting converter controller which controls operations of the master and slave inverting converters in first and second drive modes based on the driving current and the input power voltage.

19 Claims, 11 Drawing Sheets

(51) Int. Cl.
*H02M 1/36* (2007.01)
*G09G 3/20* (2006.01)
*H02M 1/00* (2006.01)
*H02M 3/155* (2006.01)

(52) U.S. Cl.
CPC ............ *H02M 2001/0019* (2013.01); *H02M 2001/0022* (2013.01); *H02M 2003/1557* (2013.01)

(56) References Cited

U.S. PATENT DOCUMENTS

2014/0347028 A1* 11/2014 Jayaraj ................ H02M 3/1588
323/282
2016/0125791 A1  5/2016 Park

* cited by examiner

DC-DC CONVERTER WITH SLAVE OPERATION DURING HIGH INPUT VOLTAGE

This application claims priority to Korean Patent Application No. 10-2017-0020095, filed on Feb. 14, 2017, and all the benefits accruing therefrom under 35 U.S.C. § 119, the content of which in its entirety is herein incorporated by reference.

BACKGROUND

1. Field

Exemplary embodiments of the invention relate to a display device. More particularly, exemplary embodiments of the invention relate to a direct current-to-direct current ("DC-DC") converter and a display device including the DC-DC converter.

2. Discussion of Related Art

A display device typically includes a DC-DC converter. The DC-DC converter changes an input power voltage to one or more power voltages used for driving pixels. For example, the DC-DC converter may supply a high power voltage (e.g., a first power voltage or a positive power voltage) and a low power voltage (e.g., a second power voltage or a negative power voltage) to the pixels through power source lines. A range of driving current flowing through a display panel may increase as the size of the display panel increases and/or a displayable luminance of the display panel.

SUMMARY

Generally, power conversion efficiency of a direct current-to-direct current ("DC-DC") converter with respect to the whole range of driving current thereof may decrease when the DC-DC converter is designed for large driving current. Additionally, conduction loss may increase as a result of relatively large internal resistance of the DC-DC converter. Conduction loss decreases conversion efficiency of the DC-DC converter and increases heat generated by the DC-DC converter.

Exemplary embodiments provide a DC-DC converter in which a first converter and a second converter including a master inverting converter and a slave inverting converter are controlled based on an input power voltage and a driving current to supply a stable power.

Exemplary embodiments provide a display device including the DC-DC converter.

According to an exemplary embodiment of the invention, a DC-DC converter includes: a first converter which converts a first power into a first power voltage and outputs the first power voltage to a first output, where the first converter includes a first inductor coupled between an input power and a first node, an inductor charge transistor coupled between the first node and a ground, a pass transistor coupled between the first node and a first output, and a body diode connected in parallel to the pass transistor; a sensor coupled between both ends of the pass transistor and which detects a driving current of a load to which the first power voltage is applied; and a second converter which receives an input power voltage from the input power and output a second power voltage lower than the first power voltage to a second output. In such an embodiment, the second converter includes a master inverting converter which outputs the second power voltage independently of the driving current, a slave inverting converter which outputs the second power voltage when the driving current is greater than a predetermined threshold or when the input power voltage is greater than a predetermined boosting voltage limit, and an inverting converter controller which controls operations of the master inverting converter and the slave inverting converter to be in a first drive mode, in which only the master inverting converter operates, and in a second drive mode, in which both the master and slave inverting converters operate, based on the driving current and the input power voltage.

In an exemplary embodiment, the inverting converter controller may include a dual driving controller which compares the driving current with the threshold, and provides a dual enable signal for driving the slave inverting converter to the slave inverting converter when the driving current is greater than the threshold, a pulse width modulation ("PWM") controller which generates a control voltage based on a voltage difference between a feedback voltage generated based on the second power voltage and a reference voltage, and generates a first PWM signal for the master inverting converter and a second PWM signal for the slave inverting converter based on the control voltage, and a shedding controller which activates a shedding period during which a change speed of a inductor current of the second converter is lowered when a drive mode changes from the first drive mode to the second drive mode or from the second drive mode to the first drive mode.

In an exemplary embodiment, the sensor may include a detector coupled between the both ends of the pass transistor and which detects the inductor current flowing through the pass transistor from the first inductor as the driving current by a current mirror when the pass transistor is turned on, and an output circuit which averages the driving current to a voltage value using a capacitor to generate a load voltage corresponding to the driving current.

In an exemplary embodiment, each of the master inverting converter and the slave inverting converter may include a switch circuit including a first switch transistor coupled between the input power and a second node, a second switch transistor coupled between the second node and the second output, and a second inductor coupled between the second node and the ground, where the first and second switch transistors are alternately turned on to convert the input power voltage to the second power voltage, and a switch controller which receives the PWM signal from the PWM controller and controls an on/off operation of the first and the second switch transistors based on the PWM signal.

In an exemplary embodiment, the shedding controller may gradually change a gate voltage of the first switch transistor of each of the master inverting converter and the slave inverting converter during the shedding period.

In an exemplary embodiment, the shedding controller may gradually change the reference voltage of the PWM controller during the shedding period.

In an exemplary embodiment, the inverting converter controller may determine a first threshold as the predetermined threshold in the first drive mode and determine a second threshold lower than the first threshold as the predetermined threshold in the second drive mode.

In an exemplary embodiment, the first converter may be driven in a synchronous mode, in which the pass transistor operates together with the inductor charge transistor to output the first power voltage, when the input power voltage is less than or equal to the boosting voltage limit.

In an exemplary embodiment, the first converter may be driven in an asynchronous mode, in which the body diode operates in place of the pass transistor to output the first power voltage, when the input power voltage is greater than the boosting voltage limit.

In an exemplary embodiment, the sensor may not operate in the asynchronous mode. In such an embodiment, both the master inverting converter and the slave inverting converter may operate in the asynchronous mode.

In an exemplary embodiment, the first PWM signal and the second PWM signal may have a phase difference of about 180 degrees with each other in the second drive mode.

In an exemplary embodiment, a frequency of the first and second PWM signals in the second drive mode may be substantially half a frequency of the first PWM signal in the first drive mode.

According to an exemplary embodiment, a display device includes: a display panel including a plurality of pixels; a gate driver which provides a gate signal to the display panel; a data driver which provides a data signal to the display panel; a DC-DC converter which provides a first power voltage and a second power voltage lower than the first power voltage to the display panel; and a timing controller which controls the gate driver, the data driver, and the DC-DC converter. In such an embodiment, the DC-DC converter includes: a first converter which output the first power voltage using one of a pass transistor and a body diode connected in parallel to the pass transistor based on a magnitude of a input power voltage; a sensor coupled between the pass transistor and which detects a driving current flowing into the display panel; and a second converter including a master inverting converter which outputs the second power voltage independently of the driving current and a slave inverting converter which outputs the second power voltage when the driving current is greater than a predetermined threshold or when the input power voltage is greater than a predetermined boosting voltage limit.

In an exemplary embodiment, the second converter may further include an inverting converter controller which control operations of the master inverting converter and the slave inverting converter to be in a first drive mode, in which only the master inverting converter operates, and in a second driver mode, in which both the master and slave inverting converters operate, based on the driving current and the input power voltage.

In an exemplary embodiment, the inverting converter controller may include a dual driving controller which compares the driving current with the threshold, and provides a dual enable signal for driving the slave inverting converter to the slave inverting converter when the driving current is greater than the threshold, a PWM controller which generates a control voltage based on a voltage difference between a feedback voltage generated based on the second power voltage and a reference voltage, and generates a first PWM signal for the master inverting converter and a second PWM signal for the slave inverting converter based on the control voltage, and a shedding controller which activates a shedding period during which a change rate of a inductor current of the second converter is lowered when a drive mode changes from the first drive mode to the second drive mode or from the second drive mode to the first drive mode.

In an exemplary embodiment, the first converter may be driven in a synchronous mode, in which the pass transistor operates together with an inductor charge transistor of the first converter to output the first power voltage, when the input power voltage is less than or equal to the boosting voltage limit.

In an exemplary embodiment, the first converter may be driven in an asynchronous mode, in which the body diode operates in place of the pass transistor to output the first power voltage, when the input power voltage is greater than the boosting voltage limit.

In an exemplary embodiment, the sensor may not operate in the asynchronous mode. In such an embodiment, both the master inverting converter and the slave inverting converter operate in the asynchronous mode.

In an exemplary embodiment, the sensor may include a detector coupled between the both ends of the pass transistor, and which detects the inductor current flowing through the pass transistor from the first inductor as the driving current by a current mirror when the pass transistor is turned on, and an output circuit which averages the driving current to a voltage value using a capacitor to generate a load voltage corresponding to the driving current.

In an exemplary embodiment, the display panel may display a black image during a predetermined start-up period, when the display device is started. In such an embodiment, the second converter may drive only the master inverting converter during the start-up period.

In exemplary embodiment, the DC-DC converter and the display device including the DC-DC converter may control the driving of the slave inverting converter, which generates the second power voltage, based on a magnitude of the driving current of the display panel, thereby reducing heat generation and power consumption and improving conversion efficiency of the power voltage. In such embodiments, since the sensor uses a turn-on resistance generated by the turn-on of the pass transistor instead of measuring the resistance by inserting other resistance elements, undesired power loss due to the resistance elements may be eliminated.

In such embodiments, the threshold compared with the driving current is adjusted in accordance with the drive mode (i.e., the first and second drive modes), and the driving of the shedding period in which the inductor currents of the inverting converters is gradually increased or decreased is inserted, so that flicker due to the drive mode switching may be prevented. Therefore, the power efficiency of the DC-DC converter may be improved without deteriorating the image display performance, and the heat generation problem may be improved.

Accordingly, the DC-DC converter may be effectively applied to a middle- to large-sized display panel having a wide driving current range.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION OF EMBODIMENTS

Figure 1:
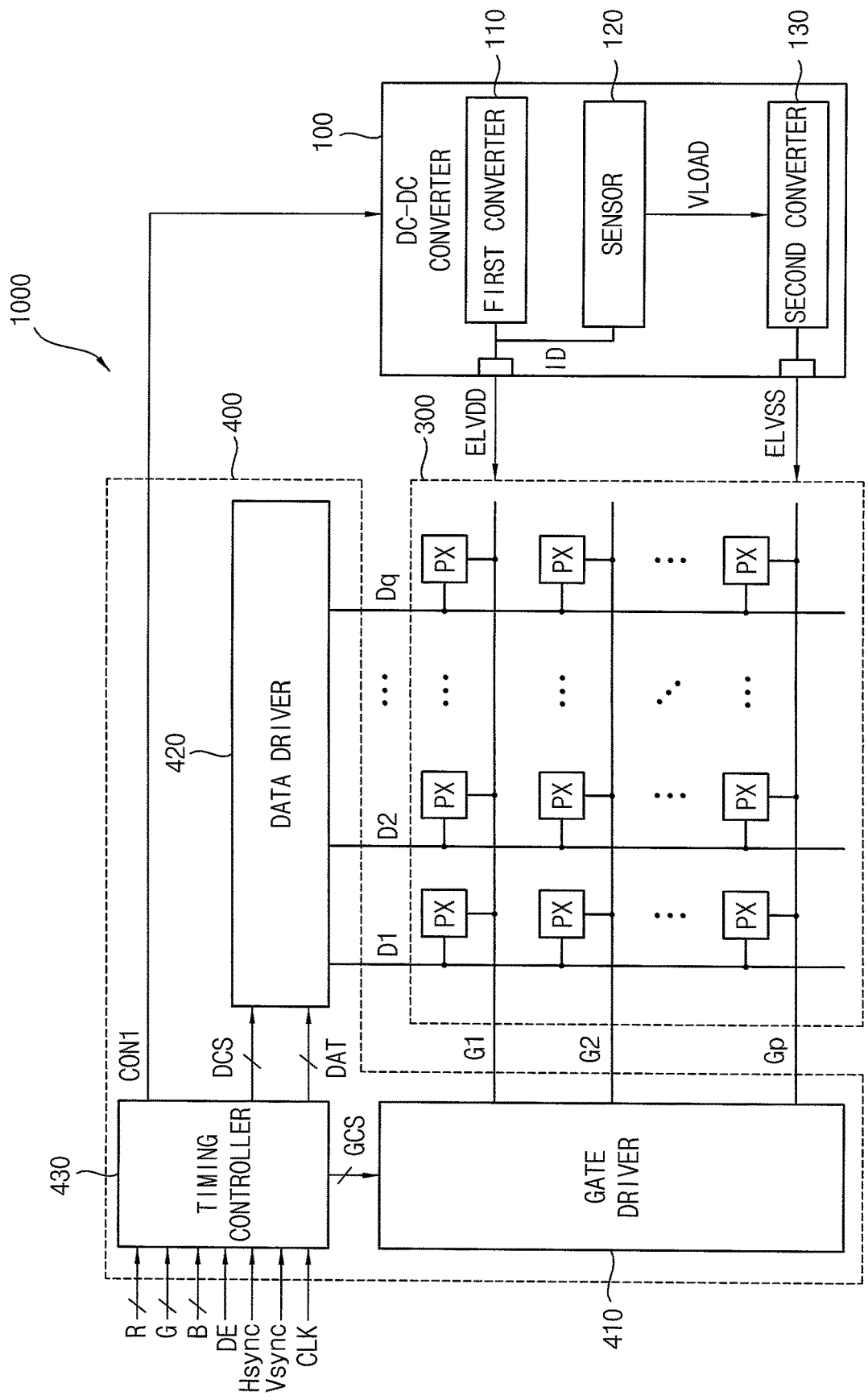
FIG. 1 is a block diagram of a display device according to exemplary embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, exemplary embodiments of the invention will be described more fully hereinafter with reference to the accompanying drawings, in which various embodiments are shown.

FIG. 1 is a block diagram of a display device according to an exemplary embodiment.

Referring to FIG. 1, an exemplary embodiment of the display device may include a direct current-to-direct current ("DC-DC") converter 100, a display panel 300, and a display panel driver 400. The display panel driver 400 may include a gate driver 410, a data driver 420, and a timing controller 430.

The display panel 300 may include a plurality of pixels PX connected to a plurality of gate lines G1 to Gp and a plurality of data lines D1 to Dq, and arranged in a matrix form, where p and q are positive integers. Each of the pixels PX may receive a first power voltage ELVDD, a second power voltage ELVSS, a gate signal and a data signal to display an image. In some embodiments, the second power voltage ELVSS may be lower than the first power voltage ELVDD. In one embodiment, for example, the first power voltage ELVDD may be a positive voltage and the second power voltage ELVSS may be a negative voltage.

In some embodiments, the display panel 300 may display a black image during a predetermined start-up period, when the display device 1000 is started. Thus, the start-up of the DC-DC converter 100 may be performed stably.

The timing controller 430 may receive RGB image signals R, G and B, a vertical synchronization signal Vsync, a horizontal synchronization signal Hsync, a main clock signal CLK, and a data enable signal DE from an external graphic controller, and may generate an output image signal DAT, a data control signal DCS, a gate control signal GCS, and a first control signal CON1 based thereon. The timing controller 430 may provide the gate control signal GCS to the gate driver 410, provide the output image signal DAT and the data control signal DCS to the data driver 420, and provide the first control signal CON1 to the DC-DC converter 100. In one embodiment, for example, the gate control signal GCS may include a vertical synchronization start signal, which controls a start of outputting the gate signal, a gate clock signal, which controls an output timing of the gate signal, and an output enable signal, which controls a duration of the gate signal. In one embodiment, for example, the data control signal DCS may include a horizontal synchronization start signal, which controls a start of outputting the data signal DATA, a data clock signal, which controls an output timing of the data signal DATA, and a load signal. In one embodiment, for example, the first control signal CON1 may include a start signal, which controls a start of driving the DC-DC converter 100.

The gate driver 410 may consecutively (e.g., sequentially) apply the gate signal to the gate lines G1 to Gp in response to the gate control signal GCS.

The data driver 420 may apply the data signal DATA to the data lines D1 to Dq in response to the data control signal DCS and the output image signal DAT.

The DC-DC converter 100 may include a first converter 110 that converts an input power voltage into the first power voltage ELVDD in response to the first control signal CON1 and outputs the first power voltage ELVDD to a first output, a sensor 120 connected to the first converter 110 to detect a driving current ID flowing into the display panel 300, and a second converter 130 that converts the input power voltage to the second power voltage ELVSS and outputs the second power voltage ELVSS to a second output.

In such an embodiment, the first converter 110 may include a first inductor coupled between an input power and a first node, an inductor charge transistor coupled between the first node and a ground, a pass transistor coupled between the first node and a first output, and a body diode connected in parallel to the pass transistor. In some embodiments, the first converter 110 may output the first power voltage ELVDD using one of the pass transistor and body diode based on a magnitude of the input power voltage.

The first converter 110 may be a boost converter that boosts the input power voltage. Since the first converter 110 is desired to output the first power voltage ELVDD of a predetermined magnitude, it is desired not to perform the boosting operation when the input power voltage is greater than a predetermined boosting voltage limit. Therefore, the body diode may be connected to the pass transistor in parallel to be used for voltage drop. In one embodiment, for example, the input power voltage may be greater than the boosting voltage limit when the display device 1000 is connected to an external charger to charge a battery.

In some embodiments, the first converter 110 may operates as a conventional boost converter when the input power voltage is below the booting voltage limit. In such embodiments, the first converter 110 may be driven in a synchronous mode in which the first power voltage ELVDD is output through the pass transistor. The pass transistor may operate in synchronization with the inductor charge transistor in the synchronous mode.

In some embodiments, the first converter 110 may be driven in an asynchronous mode in which the body diode operates, in place of the pass transistor, to output the first power voltage ELVDD when the input power voltage is greater than the booting voltage limit. Since some voltage is consumed for the operation of the body diode, the first power voltage ELVDD having the predetermined magnitude may be stably output. When the input power voltage is greater than the booting voltage limit, the pass transistor does not operate, and such a mode may be defined as the asynchronous mode opposite to the synchronous mode.

The sensor 120 may be connected between both ends of the pass transistor. The sensor 120 may detect the driving current ID applied to the display panel 300. In some embodiments, the sensor 120 may include a detector coupled between the both ends of the pass transistor to detect the inductor current flowing through the pass transistor from the first inductor as the driving current ID by a current mirror when the pass transistor is turned on and an output circuit that averages the driving current with a voltage value using a capacitor to generate a load voltage corresponding to the driving current ID. In such embodiments, since the sensor 120 uses a turn-on resistance generated by the turn-on of the pass transistor, instead of measuring the resistance by inserting a resistive element into an output wiring of the DC-DC converter 100, such that power loss due to an addition of such a resistive element may be eliminated.

In some embodiments, the sensor may not operate in the asynchronous mode. In such embodiments, since the pass transistor is turned off and the body diode operates in the asynchronous mode, the sensor 120 does not detect the driving current ID.

The second converter 130 may output the second power voltage ELVSS to the second output. In some embodiments, the second converter 130 may include a master inverting converter that outputs the second power voltage ELVSS independently of the driving current ID, a slave inverting converter that outputs the second power voltage ELVSS when the driving current ID is greater than a predetermined threshold or when the input power voltage is greater than a predetermined boosting voltage limit, and an inverting converter controller that controls operations of the master and slave inverting converters in a first drive mode, in which only the master inverting converter operates, or a second drive mode, in which both the master and slave inverting converters operate, based on the driving current ID and the input power voltage. In some embodiments, the inverting converter controller may include a dual driving controller that compares the driving current ID with the threshold, and provides a dual enable signal for driving the slave inverting converter to the slave inverting converter when the driving current ID is greater than the threshold, a pulse width modulation ("PWM") controller that generates a control voltage based on a voltage difference between a feedback voltage generated based on the second power voltage and a reference voltage, and generates a first PWM signal for the master inverting converter and a second PWM signal for the slave inverting converter based on the control voltage, and a shedding controller that activates a shedding period in which a change speed (or a change rate) of a inductor current of the second converter is lowered when a drive mode changes from the first drive mode to the second drive mode or from the second drive mode to the first drive mode.

Constructions and operations of an exemplary embodiment of the DC-DC converter 100 will be described later in greater detail with reference to FIGS. 2 to 12.

In an exemplary embodiment, as described above, the display device 1000 may control the driving of the slave inverting converter based on the driving current ID so that heat generation and power consumption may be reduced and conversion efficiency of the power voltage may be improved.

In such an embodiment, the threshold compared with the driving current ID is adjusted in accordance with the drive mode (i.e., the first drive mode and the second drive mode) and the operations of the shedding period in which the inductor current of the inverting converters are gradually increased or decreased are inserted, such that the flicker issue due to the drive mode conversion may be effectively prevented. In such an embodiment, the efficiency of the DC-DC converter 100 may be improved and heat generation of the DC-DC converter 100 may be reduced without degrading the image display performance.

Thus, the DC-DC converter 100 may be effectively applied to middle to large-sized display panels having a wide driving current range.

Figure 2:
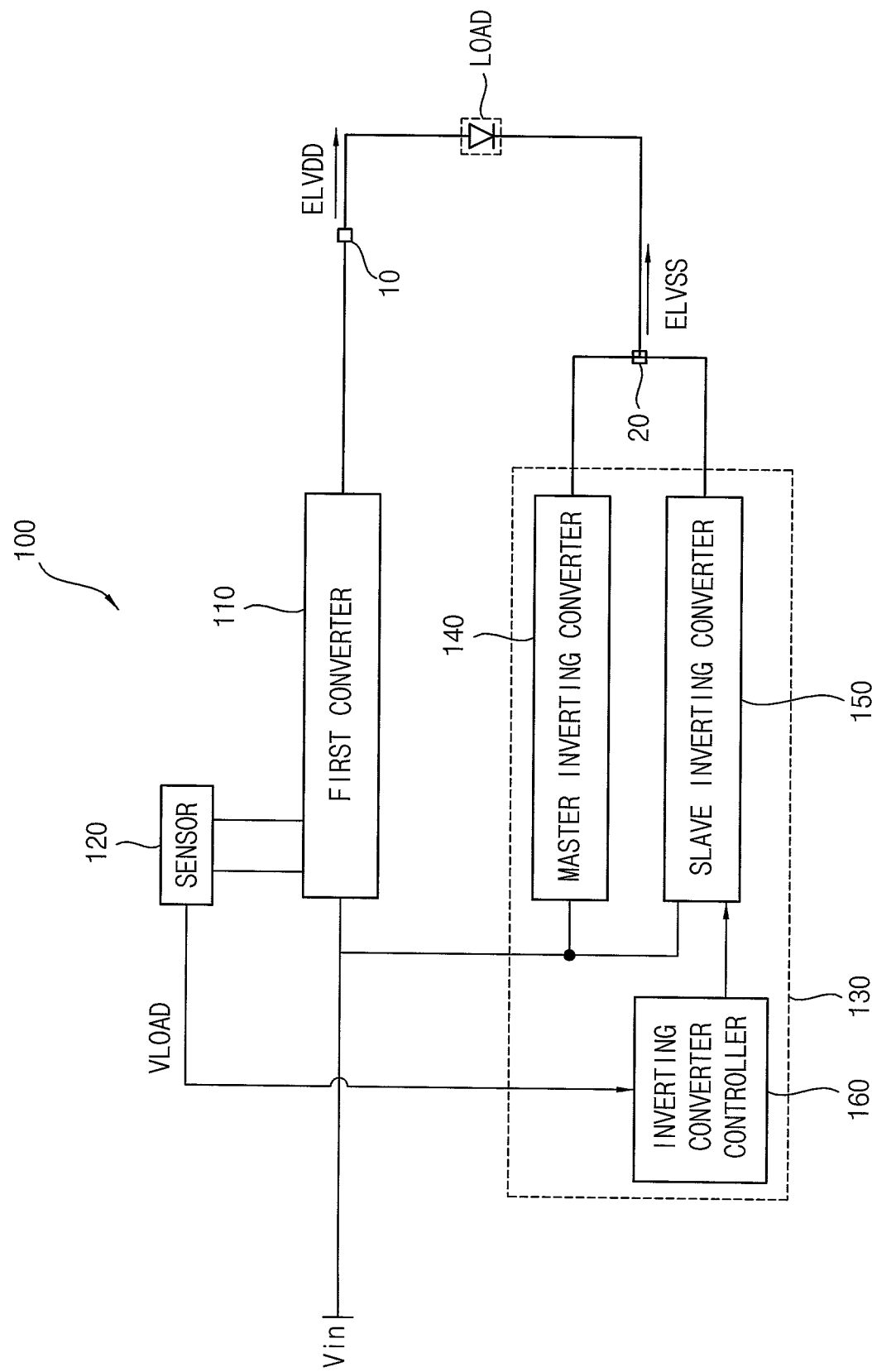
FIG. 2 is a block diagram of a direct current-to-direct current ("DC-DC") converter according to exemplary embodiments.
Figure 3:
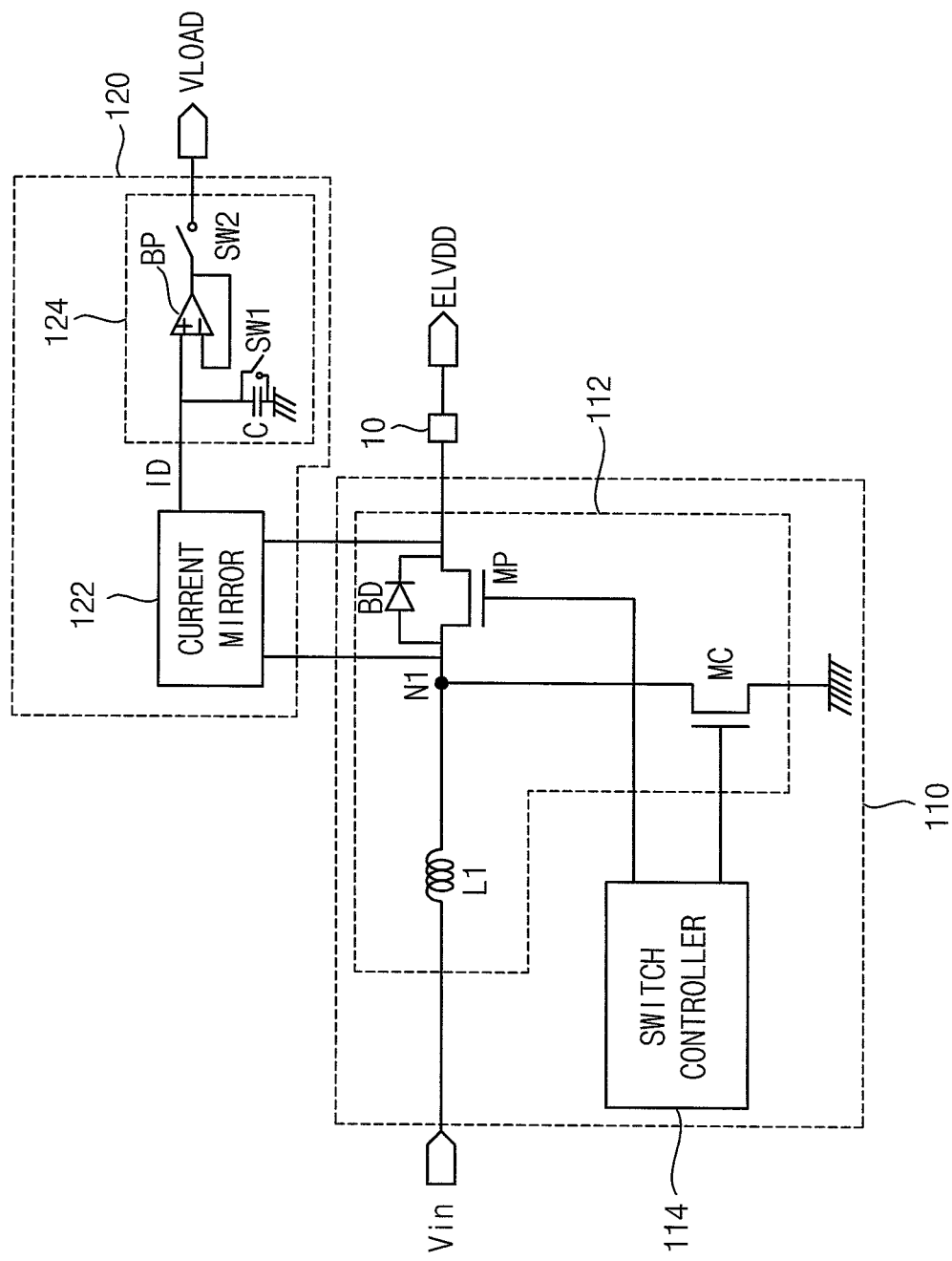
FIG. 3 illustrates an exemplary embodiment of a connection relation between a first converter and a sensor included in the DC-DC converter of FIG. 2.
Figure 4:
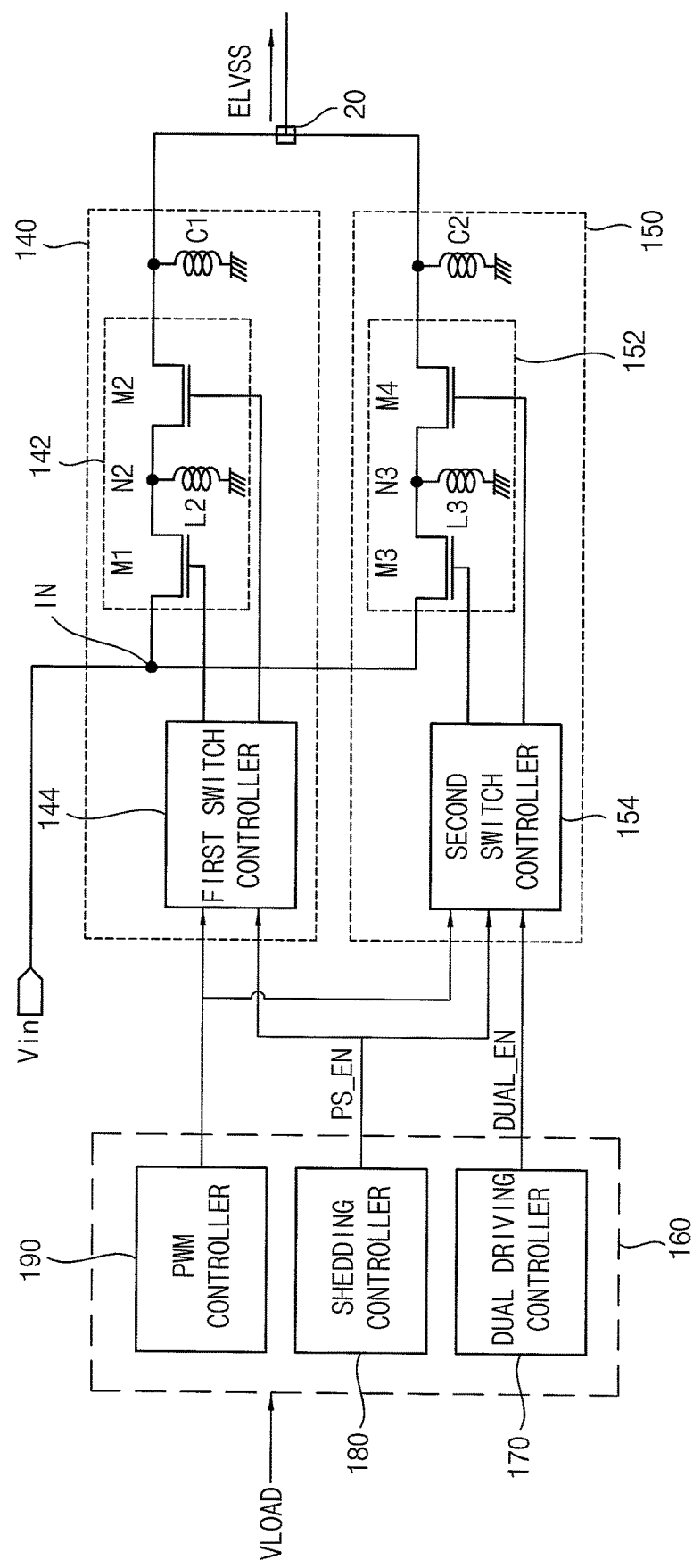
FIG. 4 illustrates an exemplary embodiment of a second convert included in the DC-DC converter of FIG. 2.
Figure 5:
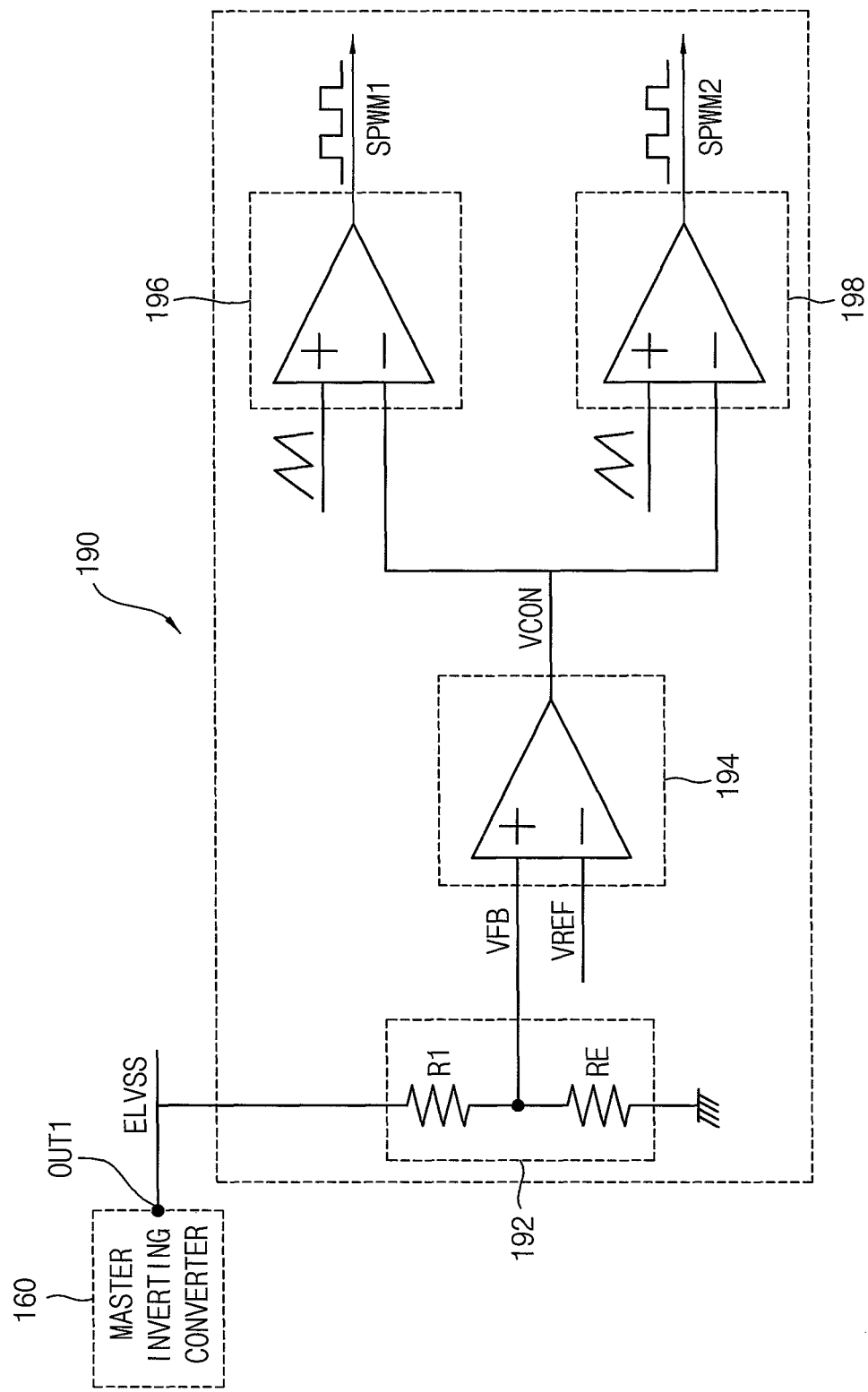
FIG. 5 illustrates an exemplary embodiment of a PWM controller included in the second converter of FIG. 4.

FIG. 2 is a block diagram of a DC-DC converter according to an exemplary embodiment. FIG. 3 illustrates a connection relation between an exemplary embodiment of a first converter and a sensor included in the DC-DC converter of FIG. 2. FIG. 4 illustrates an exemplary embodiment of a second convert included in the DC-DC converter of FIG. 2. FIG. 5 illustrates an exemplary embodiment of a PWM controller included in the second converter of FIG. 4.

Referring to FIGS. 2 to 5, an exemplary embodiment of the DC-DC converter 100 may include a first converter 110, a sensor 120, and a second converter 130.

In such an embodiment, as illustrated in FIGS. 2 and 3, the first converter 110 may include a switch circuit 112 having a first inductor L1 coupled between an input power voltage Vin and a first node N1, an inductor charge transistor MC coupled between the first node N1 and a ground, a pass transistor MP coupled between the first node N1 and a first output 10, and a body diode BD connected in parallel to the pass transistor MP, and a switch controller 114. The first converter 110 may convert the input power voltage Vin into the first power voltage ELVDD and output the first power voltage ELVDD to the first output 10.

The first inductor L1 may generate an electromotive force by the turned-on inductor charge transistor MC.

The inductor charge transistor MC may be turned on by receiving a control signal from the switch controller 114 and control a current to flow through the first inductor L1.

The pass transistor MP and the inductor charge transistor MC may be alternately turned on in a synchronous mode in which the input power voltage Vin is less than or equal to a predetermined boosting voltage limit. Thus, after the inductor charge transistor MC is turned on and the electromotive force is generated in the first inductor L1, the pass transistor MP is turned on to convert the input power voltage Vin into the first power voltage ELVDD. That is, in the synchronous mode, the pass transistor MP may be turned on alternately in synchronization with the inductor charge transistor MC. In one embodiment, when the DC-DC converter 100 is started, the sensor 120 may start the sensing operation after a predetermined delay period has elapsed from a time point at which the driving of the first converter 110 starts operating.

In such an embodiment, the pass transistor MP may be turned off and the body diode BD may be turned on according to a voltage of the first node N1 in an asynchronous mode in which the input power voltage Vin is greater than the boosting voltage limit. In the asynchronous mode, the body diode BD may operate in place of the pass transistor ME Since a predetermined voltage is consumed in the body diode BD, the first power voltage ELVDD having a substantially constant magnitude may be stably output even if the input power voltage Vin is largely fluctuated. In such an embodiment, the pass transistor MP is not synchronized with the inductor charge transistor MC in the asynchronous mode.

In such an embodiment, the sensor 120 may be coupled between the both ends of the pass transistor MP to detect a driving current ID applied to a load (e.g., a display panel) receiving the first power voltage ELVDD. The sensor 120 may detect an inductor current generated by the first inductor L1 as the driving current ID in the synchronous mode. In the asynchronous mode, the pass transistor MP does not operate and the first power voltage ELVDD may be output through the body diode BD. Thus, the sensor 120 may not operate in the asynchronous mode. In some embodiments, as shown in FIG. 3, the sensor 120 may include a detector 122 and an output circuit 124.

The detector 122 may detect the inductor current flowing from the first inductor L1 through the pass transistor MP when the pass transistor MP is turned on. The inductor current may be defined as a driving current ID, and the detector 122 may include or be configured as a current mirror. The current mirror may be implemented as a conventional current mirror circuit including a plurality of transistors.

The output circuit 124 may include a capacitor C that receives the driving current ID, a first switch SW1 connected in parallel to the capacitor C to average the driving current ID to a voltage value, a buffer BP connected to one end of the capacitor C, and a second switch SW2 that controls an output of the buffer BP. The output circuit 124 may average the driving current ID to the voltage value to generate a load voltage VLOAD corresponding to the driving current ID. The load voltage VLOAD may be provided to the second converter 130.

In some embodiments, an additional sensor may be further connected to the second converter 130. The additional sensor may detect a driving current from the second power voltage ELVSS. In such embodiments, the second converter 130 may be driven in both the first and second drive modes in the asynchronous mode.

In such an embodiment, the sensor 120 does not include the resistance element and uses the turn-on resistance generated by the turn-on of the pass transistor MP, such that power consumption is reduced by eliminating the power loss caused by the addition of resistance element.

In such embodiments, as shown in FIGS. 2 and 4, the second converter 130 may include a master inverting converter 140, a slave inverting converter 150, and an inverting converter controller 160. Each of the master and slave inverting converters 140 and 150 may include a switch circuit 142 or 152, and a switch controller 144 or 154.

The master inverting converter 140 may output the second power voltage ELVSS independently of a magnitude of the driving current ID. In such an embodiment, as illustrated in FIG. 4, the master inverting converter 140 may include a first switch circuit 142 and a first switch controller 144.

The first switch circuit 142 may include a first switch transistor M1, a second switch transistor M2, and a second inductor L2.

The first switch transistor M1 may be coupled between an input node IN that receives the input power voltage Vin and a second node N2. The first switch transistor M1 may be turned on based on a control signal from the first switch controller 144 to control a current to flow through the second inductor L2.

The second switch transistor M2 may be coupled between the second node N2 and a second output 20. The second switch transistor M2 may be turned on alternately with the first switch transistor M1. Therefore, after the first switch transistor M1 is turned on and an electromotive force is generated in the second inductor L2, the second switch transistor M2 is turned on, thereby turning the input power voltage Vin to the second power voltage ELVSS and output the second power voltage ELVSS to the second output 20.

In an embodiment, the second node N2 may be a common node connected to the first switch transistor M1, the second switch transistor M2 and the second inductor L2.

The first switch controller 144 may receive a first PWM signal from the inverting converter controller 160 and control on-off operations of the first and second switch transistors M1 and M2 based on the first PWM signal. The first and second switch transistors M1 and M2 may be alternately turned on/off. In some embodiments, the first switch controller 144 may gradually change a gate voltage of the first switch transistor M1 during a shedding period based on a shedding enable signal PS_EN received from the inverting converter controller 160. Thus, the current flowing in the second inductor L2 may gradually change during the shedding period, and abrupt change of the second power voltage ELVSS may be effectively prevented.

The master inverting converter 140 may further include a first capacitor C1 connected between the second output 20 and the ground. The first capacitor C1 may stabilize the output of the second power voltage ELVSS.

In some embodiments, when the DC-DC converter 100 is started, the master inverting converter 140 start driving after a predetermined delay period has elapsed from a time point at which the first converter 110 and the sensor 120 start operating.

In an embodiment, the slave inverting converter 150 may output the second power voltage ELVSS when the driving current ID is greater than a predetermined threshold or when the input power voltage Vin is greater than the boosting voltage limit. The slave inverting converter 150 may include a second switch circuit 152 and a second switch controller 154. The second switch circuit 152 may include a third switch transistor M3, a fourth switch transistor M4, and a third inductor L3. Since the configuration of the second switch circuit 152 is substantially the same as the first switch circuit 142, any repetitive detailed descriptions thereof will be omitted.

In such an embodiment, only the master inverting converter 140 may operate when the driving current ID is small (e.g., the driving current ID is less than or equal to the threshold). When the driving current ID is large (e.g., the driving current ID is greater than the threshold), the current for generating the second power voltage ELVSS may be divided into the respective inverting converters 140 and 150 by driving the master and slave inverting converters 140 and 150. Therefore, the total conduction loss and the power consumption may be reduced, and the efficiency of the power voltage output may be increased.

In some embodiments, the second converter 130 may further include a plurality of slave inverting converters. In such embodiments, each of the slave inverting converters may be sequentially driven based on different thresholds from each other.

In the asynchronous mode, both the master and slave inverting converters 140 and 150 may operate without sensing the driving current ID because the conduction loss and the power consumption are considerably minimal in the asynchronous mode in which the apparatus including the DC-DC converter 100 is being charged.

In some embodiments, the second switch controller 154 may gradually change a gate voltage of the third switch transistor M3 during the shedding period based on the shedding enable signal PS_EN received from the inverting converter controller 160. Thus, the current flowing in the third inductor L3 may gradually change during the shedding period, and abrupt change of the second power voltage ELVSS can be prevented.

The inverting converter controller 160 may control operations of the master inverting converter 140 and the slave inverting converter 150 to be in the first drive mode or the second drive mode based on the magnitude of the driving current ID and the magnitude of the input power voltage Vin. The first drive mode may be a drive mode in which only the master inverting converter 140 operates. The second drive mode may be a drive mode in which both the master and slave inverting converters 140 and 150 operate. The inverting converter controller 160 may include a dual driving controller 170, a shedding controller 180, and a PWM controller 190.

In some embodiments, when the DC-DC converter 100 is started, the inverting converter controller 160 may start driving the master inverting converter 140 after a predetermined delay period has elapsed from a time point at which the first converter 110 and the sensor 120 start operating.

In such embodiments, the dual driving controller 170 may compare the driving current ID and the threshold. The dual driving controller 170 may provide a dual enable signal DUAL_EN for driving the slave inverting converter 150 to the slave inverting converter 150 when the driving current ID is greater than the threshold. In some embodiments, the shedding period may start in synchronization with the transition of the dual enable signal DUAL_EN.

The dual driving controller 170 may adjust the threshold. In some embodiments, the dual driving controller 170 may change the threshold to be a first threshold in the first drive mode and change the threshold to be a second threshold, which is less than the first threshold, in the second drive mode. Accordingly, in such embodiments, efficiency deterioration due to frequent change of the drive mode against a minute change of the driving current ID may be effectively prevented.

In embodiments, the shedding controller 180 may activate the shedding period during which a change speed of the inductor current of the second converter 130 is lowered when the drive mode changes from the first drive mode to the second drive mode or from the second drive mode to the first drive mode. In such embodiments, the shedding period may proceed for a predetermined time from the time of starting driving of the slave inverting converter 150 and from the time of end of driving of the slave inverting converter 150. Accordingly, abrupt variation of the second power voltage ELVSS and flicker due to the abrupt variation of the second power voltage ELVSS may be effectively prevented when the drive mode is changed. In one embodiment, for example, the shedding period may be set to about 1 millisecond (ms).

In embodiments, during a first shedding period in which the first drive mode is changed to the second drive mode (i.e., the driving of the slave inverting converter 150 starts), the inductor current of the master inverting converter 140 may be gradually decreased by the shedding controller 180 and the inductor current of the slave inverting converter 150 may be gradually increased by the shedding controller 180. In such embodiments, during a second shedding period in which the second drive mode is changed to the first drive mode (i.e., the driving of the slave inverting converter 150 is terminated), the inductor current of the master inverting converter 140 may be gradually increased by the shedding controller 180 and the inductor current of the slave inverting converter 150 may be gradually decreased by the shedding controller 180. In some embodiments, the shedding controller 180 may gradually change the gate voltages of the first and third switch transistor M1 and M3 during the shedding period. In some embodiments, the shedding controller 180 may gradually change a reference voltage VREF applied to the PWM controller 190 during the shedding period.

In such embodiments, as illustrated in FIGS. 4 and 5, the PWM controller 190 may generate a control voltage VCON based on a voltage difference between a feedback voltage VFB generated based on the second power voltage ELVSS and the reference voltage VREF (e.g., a predetermined reference voltage), and may generate the first PWM signal SPWM1 for the master inverting converter 140 and a second PWM signal SPWM2 for the slave inverting converter 150 based on the control voltage VCON. The first PWM signal SPWM1 may be applied to the first switch controller 144, and the second PWM signal SPWM2 may be applied to the second switch controller 154.

The PWM controller 190 may generate the PWM signal (e.g., the first and second PWM signals SPWM1 and SPWM2) having a specific frequency based on the voltage difference to adjust frequencies of the first and second switch circuits 142 and 152. In one embodiment, for example, when the feedback voltage VFB increases, the PWM controller 190 increases the frequency of the PWM signal. In such an embodiment, when the feedback voltage VFB decreases, the PWM controller 190 decreases the frequency of the PWM signal. The PWM signal may correspond to a square wave.

In some embodiments, as shown in FIG. 5, the PWM controller 190 may include a voltage divider 192, an error amp 194, a first PWM signal generator 196, and a second PWM signal generator 198.

The voltage divider 192 may be connected to one of the master and slave inverting converters 140 and 150. The voltage divider 192 may divide the second power voltage ELVSS to generate the feedback voltage VFB. In some embodiments, the voltage divider 192 may include a plurality of resistors R1 and R2 that are connected to an output OUT1 of the master inverting converter 140.

The error amp 194 may amplify the difference between the feedback voltage VFB and the reference voltage VREF, and output the control voltage VCON. The level of the control voltage VCON may vary depending on the difference between the feedback voltage VFB and the reference voltage VREF. The pulse width (frequency) and/or phase of the PWM signals SPWM1 and SPWM2 may be determined based on the control voltage VCON or according to the level of the control voltage VCON.

The first PWM signal generator 196 may generate the first PWM signal SPWM1 based on the control voltage VCON, and output the first PWM signal SPWM1 to the master inverting converter 140. The second PWM signal generator 198 may generate the second PWM signal SPWM2 based on the control voltage VCON, and output the second PWM signal SPWM2 to the slave inverting converter 150.

In some embodiments, the first and second PWM signal generators 196 and 198 may have a substantially same circuit configuration as each other. In one embodiment, for example, the first PWM signal generator 196 may receive the control voltage VCON and a saw-tooth wave, compare the control voltage VCON with the saw-tooth wave, and output the square wave PWM signal SPWM. The second PWM signal generator 198 operates substantially in the same manner as the first PWM signal generator 196, and thus any repetitive detailed description thereof will be omitted.

In some embodiments, the shedding controller 180 may gradually change the reference voltage VREF applied to the error amp 194 during the shedding period. The abrupt change of the second power voltage ELVSS may be effectively prevented by the stepwise change of the reference voltage VREF.

In such embodiments, as illustrated in FIG. 5, since only a single voltage divider 192 and only a single error amp 194 may be provided for the master inverting converter 140 and the slave inverting converter 150, the configuration of the second converter 130 may be simplified.

Figure 6:
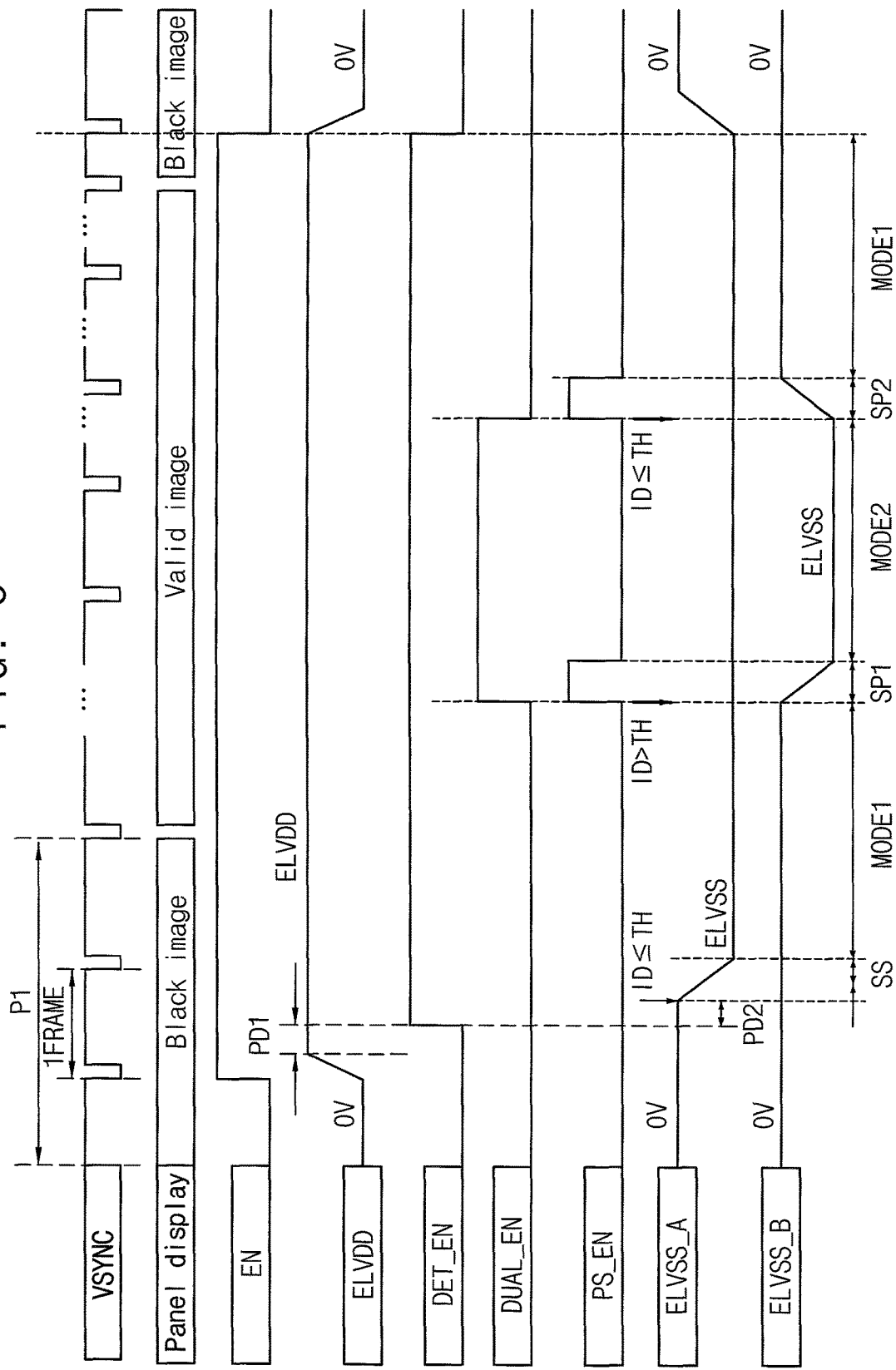
FIG. 6 is a timing diagram illustrating an exemplary embodiment of an operation of the DC-DC converter of FIG. 2 included in the display device of FIG. 1.

FIG. 6 is a timing diagram illustrating an exemplary embodiment of an operation of the DC-DC converter of FIG. 2 included in the display device of FIG. 1.

Referring to FIGS. 1, 2, and 6, the second converter 130 may operate based on the magnitude of the driving current ID. The display panel 300 may display a black image during a predetermined start-up period P1.

Figure 7:
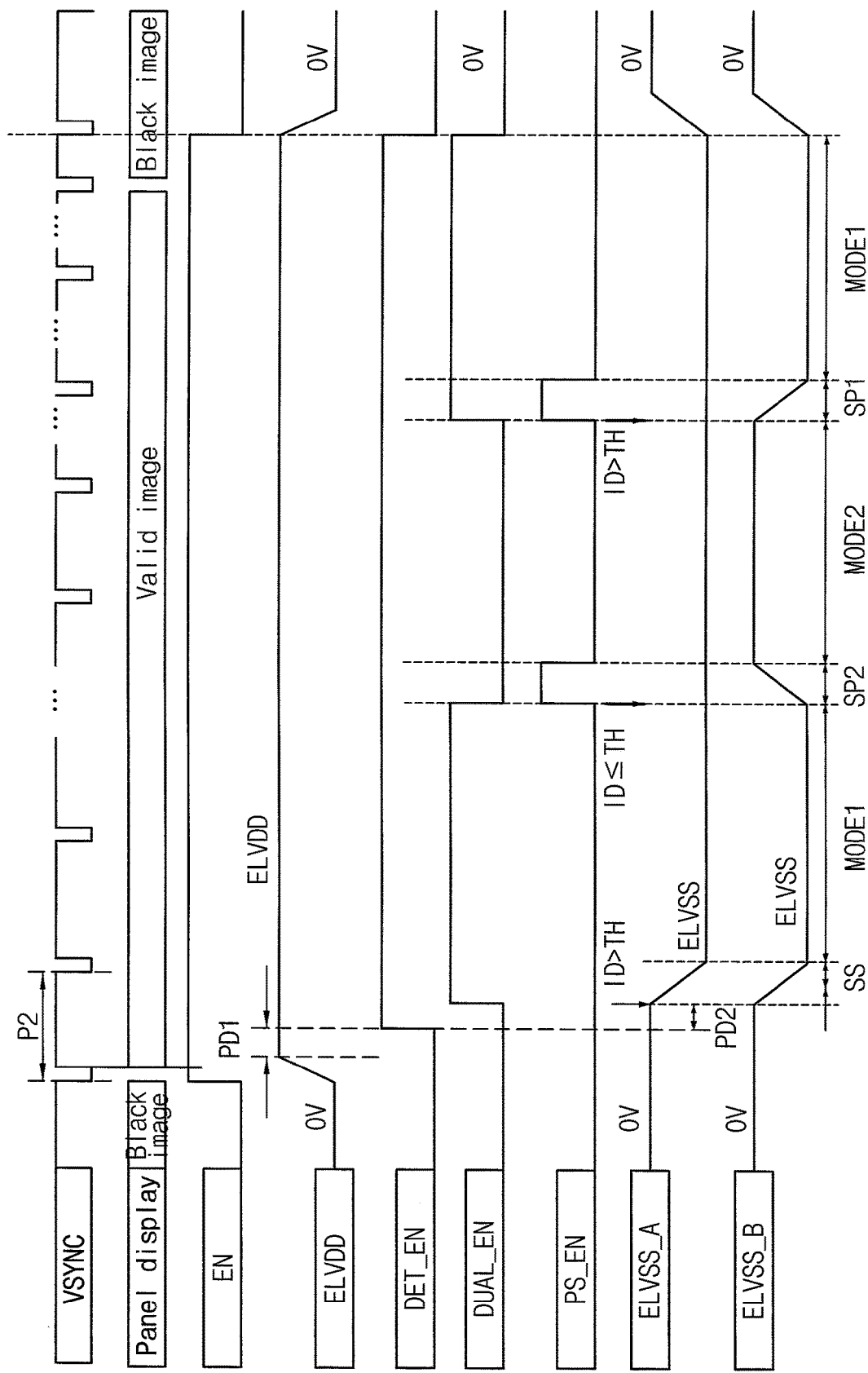
FIG. 7 is a timing diagram illustrating an alternative exemplary embodiment of an operation of the DC-DC converter of FIG. 2 included in the display device of FIG. 1.

FIG. 6 shows an operation of the DC-DC converter of the DC-DC converter 100 when the display device 1000 and the DC-DC converter 100 operate in the synchronous mode, that is, when the input power voltage Vin is smaller than the preset boosting voltage limit. In FIGS. 6 and 7, ELVSS_A and ELVSS_B represent an output terminal of the master inverting converter 140 connected to the second output 20 and an output terminal of the slave inverting converter 150 connected to the second output 20, respectively.

When an enable signal EN for driving the DC-DC converter 100 is activated, the first converter 110 may output the first power voltage ELVDD.

When a predetermined first delay period PD1 elapses after the first power voltage ELVDD is output, a detection enable signal DET_EN may be activated and the sensor 120 may start detecting the driving current ID. The first delay period PD1 may a time for stabilizing the driving of the first converter 110. In one embodiment, for example, the first delay period PD1 may be set to about 1 ms.

When a predetermined second delay period PD2 elapses after the detection enable signal DET_EN is activated, the master inverting converter 140 may output the second power voltage ELVSS, which gradually changes during a soft start period SS after the second delay period PD2. The second delay period PD2 is a period for stabilizing the operation of the sensor 120. Since the black image is displayed during the second delay period DP2, the driving current ID is smaller than the preset threshold TH. Then, the second converter 130 may operate in the first drive mode MODE1 until the driving current ID exceeds the threshold TH.

When the driving current ID exceeding the threshold TH is detected, the dual enable signal DUAL_EN is activated and the slave inverting converter 150 may start an operation thereof. The shedding enable signal PS_EN may be activated simultaneously with the activation of the dual enable signal DUAL_EN, thereby starting the first shedding period SP1. The driver mode may be changed from the first drive mode MODE1 to the second drive mode MODE2 during the first shedding period SP1. The inductor current in the master inverting converter 140 may decrease gradually during the first shedding period SP1. The inductor current in the slave inverting converter 150 may increase gradually during the first shedding period SP1. The first shading period SP1 may be set to about 1 ms. Thus, the abrupt change of the second power voltage ELVSS due to the drive mode change may be effectively prevented. Then, the second converter 130 may operate in the second drive mode MODE2 until the driving current ID falls below the threshold TH.

In such an embodiment, when the driving current ID below the threshold TH is detected, the dual enable signal DUAL_EN may be inactivated and the slave inverting converter 150 may terminate the operation thereof. Simultaneously with the deactivation of the dual enable signal DUAL_EN, the shedding enable signal PS_EN may be activated to start the second shedding period SP2. The drive mode is switched from the second drive mode MODE2 to the first drive mode MODE1 during the second shedding period SP2. The inductor current in the master inverting converter 140 may increase gradually during the second shedding period SP2. The inductor current in the slave inverting converter 150 may decrease gradually during the second shedding period SP2. The second shedding period SP2 may be set to about 1 ms. Thus, the abrupt change of the second power voltage ELVSS due to the drive mode change may be effectively prevented.

FIG. 7 is a timing diagram illustrating an alternative exemplary embodiment of an operation of the DC-DC converter of FIG. 2 included in the display device of FIG. 1.

Since the operation of the DC-DC converter shown in FIG. 7 may be substantially the same as or similar to the operation of FIG. 6 except for a start-up period P2, any repetitive detailed descriptions will be omitted or simplified. FIG. 7 shows an operation of the DC-DC converter when the display device 1000 and the DC-DC converter 100 operate in the synchronous mode.

Referring to FIG. 7, the second converter 130 may operate based on a magnitude of the driving current ID. When a high-luminance image is displayed from the start of the display device 1000, the driving current ID may exceed the threshold TH.

When an enable signal EN for driving the DC-DC converter 100 is activated, the first converter 110 may output the first power voltage ELVDD.

When a predetermined delay period PD1 elapses after the first power voltage ELVDD is output, a detection enable signal DET_EN may be activated and the sensor 120 may start detecting the driving current ID.

When a predetermined delay period PD2 elapses after the detection enable signal DET_EN is activated, the second converter 130 may start an operation thereof. The driving current ID detected during the second delay period PD2 may exceed the threshold TH. When the driving current ID detected during the second delay period PD2 exceeds the threshold TH, the master inverting converter 140 and the slave inverting converter 150 may simultaneously output the second power voltage ELVSS through a soft start period SS.

In such an embodiment, the operations in the first drive mode MODE1, the second drive mode MODE2, and the shedding periods SP3 and SP4 are substantially the same as those described above referred to FIG. 6, and any repetitive detailed descriptions thereof will be omitted.

Figure 8:
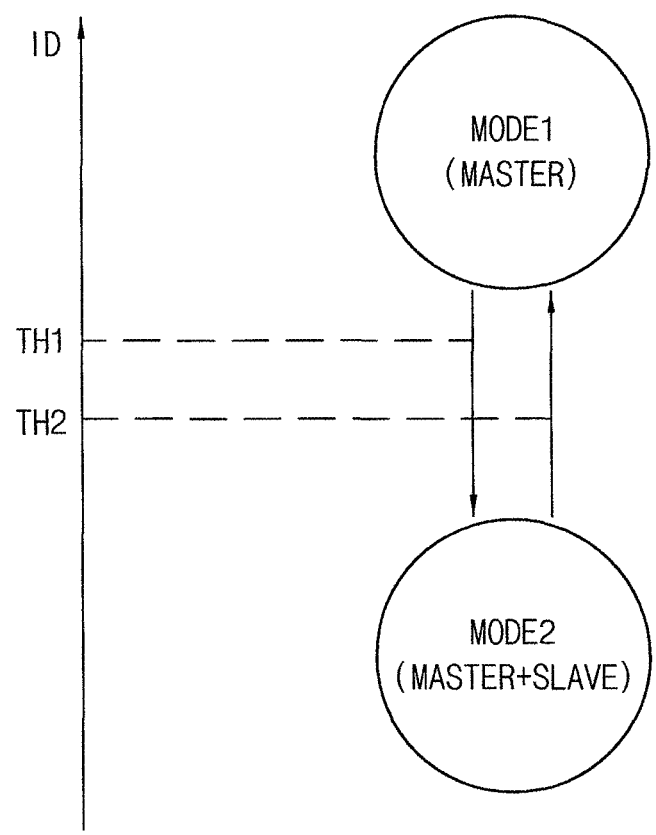
FIG. 8 illustrates an exemplary embodiment in which the DC-DC converter of FIG. 2 sets different thresholds based on a change of a drive mode.

FIG. 8 illustrates an exemplary embodiment in which the DC-DC converter of FIG. 2 sets different thresholds based on a change of a drive mode.

Referring to FIGS. 2, 4, and 8, in an exemplary embodiment, the inverting converter controller 160 may determine the threshold as a first threshold TH1 in the first drive mode MODE1. In such an embodiment, the inverting converter controller 160 may change the threshold to be a second threshold TH2 less than the first threshold TH1 in the second drive mode MODE2. Here, it is assumed that the DC-DC converter 100 operates in the synchronous mode.

When the drive mode is changed frequently due to a minute variation of the driving current ID, the efficiency of the second converter 130 may decrease. The threshold may increase to the first threshold TH1 in the first drive mode MODE1 in which only the master inverting converter 140 operates. The threshold may decrease to the second threshold TH2 in the second drive mode MODE2 in which both the master and slave inverting converters 140 and 150 operate. In one embodiment, for example, a difference between the first threshold TH1 and second threshold TH2 may be in a range from about 50 milliampere (mA) to about 100 mA. Therefore, in such an embodiment, the drive mode may be effectively prevented from being changed from time to time, thereby minimizing the efficiency deterioration.

Figure 9:
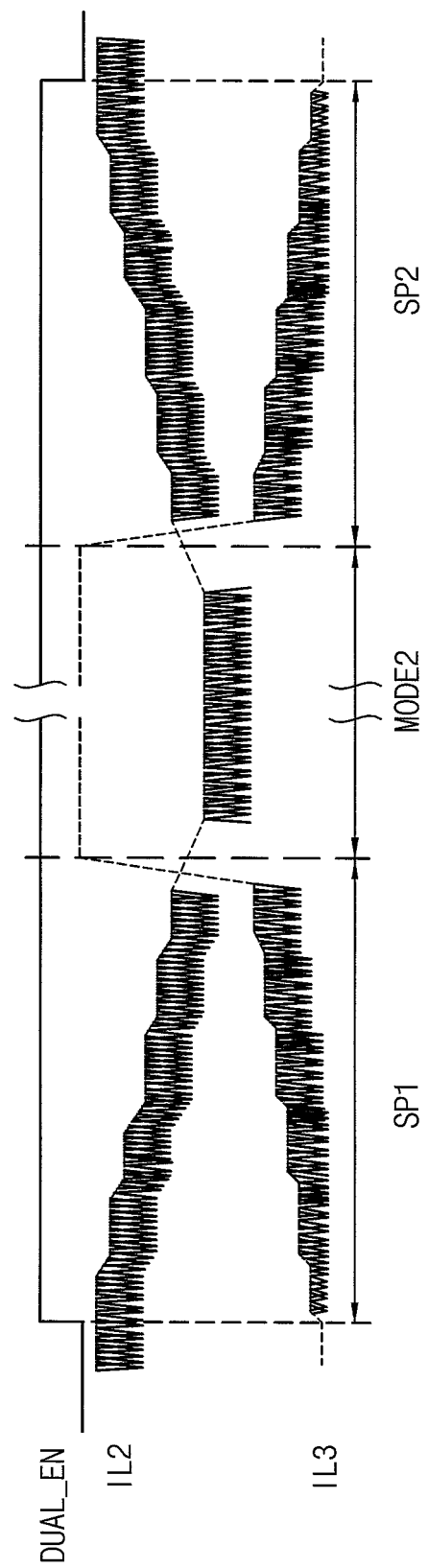
FIG. 9 is a timing diagram illustrating an exemplary embodiment of an operation of the DC-DC converter of FIG. 2 in a shedding period.

FIG. 9 is a timing diagram illustrating an exemplary embodiment of an operation of the DC-DC converter of FIG. 2 in a shedding period.

Referring to FIGS. 2, 4, 6 and 9, in an exemplary embodiment, the driving of the DC-DC converter 100 may include a shedding period during which the drive mode is switched from the first drive mode MODE1 to the second drive mode MODE2 and/or from the second drive mode MODE2 to the first drive mode MODE1.

The shedding controller 180 in the inverting converter controller 160 may decrease a change speed (or change rate) of the inductor current IL2 in the master inverting converter 140 and a change speed of the inductor current IL3 in the slave inverting converter 150 during the first and second shedding periods SP1 and SP2. In one embodiment, for example, during the first shedding period SP1, the shedding controller 180 may gradually decrease the inductor current IL2 of the master inverting converter 140 and gradually increase the inductor current IL3 of the slave inverting converter 150. In such an embodiment, during the second shedding period SP2, the shedding controller 180 may gradually increase the inductor current IL2 of the master inverting converter 140 and gradually decrease the inductor current IL3 of the slave inverting converter 150.

In some embodiments, the shedding controller 180 may gradually change gate voltages of the first switch transistor M1 and the second switch transistor M2 to decrease the change speed of the inductor currents IL2 and LI3 during the shedding period. The gate voltages of the first switch transistor M1 and the second switch transistor M2 are applied to gate electrodes of the first and second switch transistors M1 and M2, respectively.

In some embodiments, the shedding controller 180 may gradually change the reference voltage VREF applied to the PWM controller 190 during the shedding period. Since the frequency of the PWM signal varies according to the reference voltage VREF, the change speed of the inductor currents IL2 and IL3 may be controlled.

Accordingly, abrupt change of the second power voltage ELVSS and flicker may be effectively prevented when the drive mode is changed.

Figure 10:
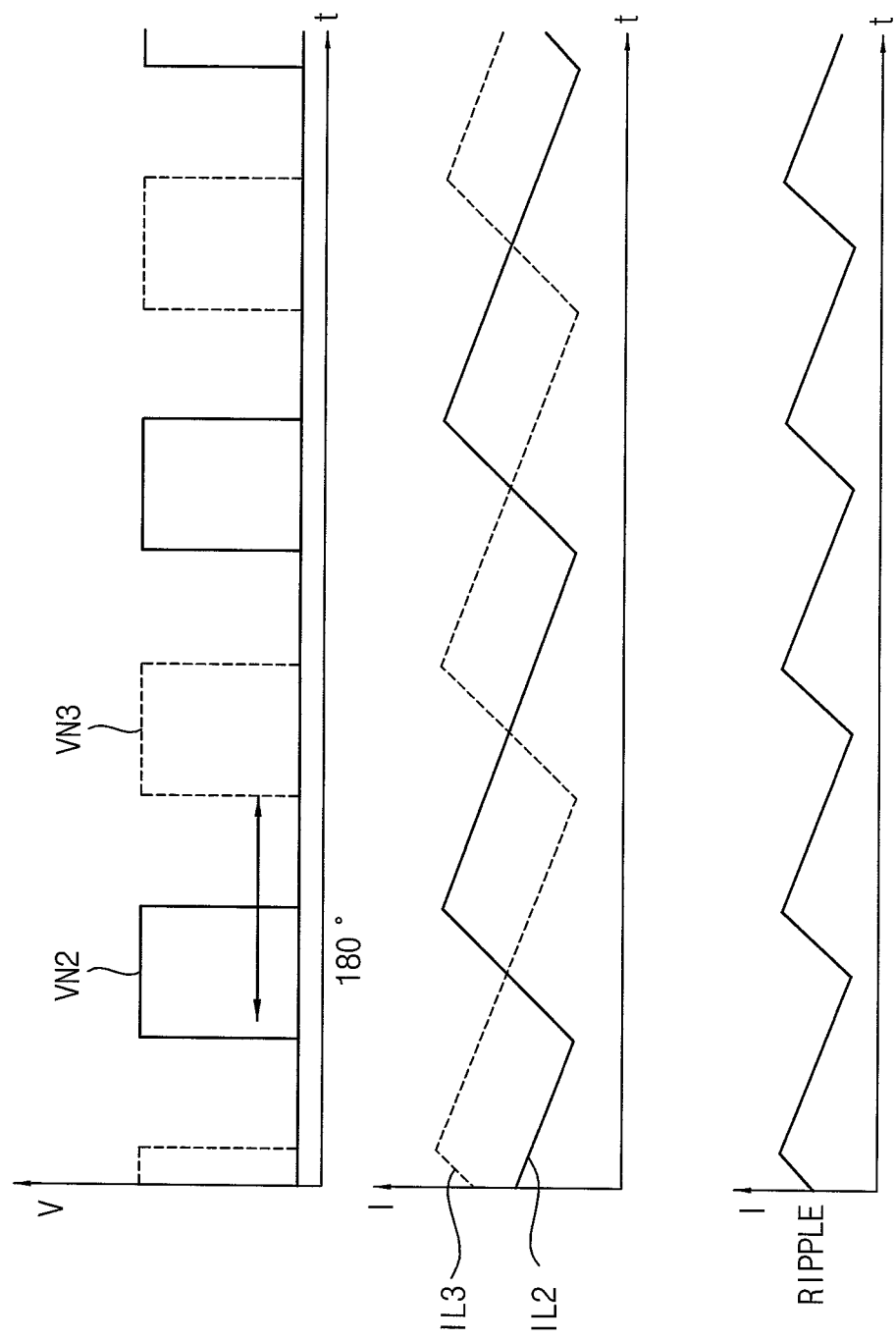
FIG. 10 is a timing diagram illustrating an exemplary embodiment in which the second converter included in the DC-DC converter of FIG. 2 operates using a phase shift in a second drive mode.

FIG. 10 is a timing diagram illustrating an exemplary embodiment in which the second converter included in the DC-DC converter of FIG. 2 operates using a phase shift in a second drive mode.

Referring to FIGS. 4 and 10, both the master inverting converter 140 and the slave inverting converter 150 may operate to output the second power voltage ELVSS in the second drive mode.

In some embodiments, the first PWM signal SPWM1 and the second PWM signal SPWM2 may have a phase difference of about 180 degrees with each other in the second drive mode. Thus, a second node voltage VN2 of the master inverting converter 140 and a third node voltage VN3 of the slave inverting converter 150 may have the phase difference of about 180 degrees with each other in the second drive mode. Therefore, as illustrated in FIG. 10, the inductor current IL2 of the master inverting converter 140 and the inductor current IL3 of the slave inverting converter 150 may have a phase difference.

Thus, a frequency of the output ripple RIPPLE of the second converter 130 in the second drive mode may be about twice the frequency of the output ripple RIPPLE of the second converter 130 in the first drive mode. That is, since the output ripple RIPPLE becomes faster due to the phase shift in the second drive mode, the output stability may be increased.

In some embodiments, the first PWM signal SPWM1 and the second PWM signal SPWM2 may have phases opposite to each other in the second drive mode, and the frequency of the first and second PWM signals SPWM1 and SPWM2 in the second drive mode may be about half the frequency of the first PWM signal SPWM1 in the first drive mode. In such embodiments, the output ripple RIPPLE in the second drive mode may be substantially the same as that in the first drive mode. However, since the frequencies of the first and second PWM signals SPWM1 and SPWM2 are halved, frequencies of switching the switch transistors may be reduced by half. Therefore, the power loss due to frequent switching of the switch transistors may be reduced.

In such embodiment, as described above, the output stability of the second power voltage EVLSS may be improved by setting the phase difference between the first PWM signal SPWM1 and the second PWM signal SPWM2 and adjusting the frequency in the second drive mode.

Figure 11:
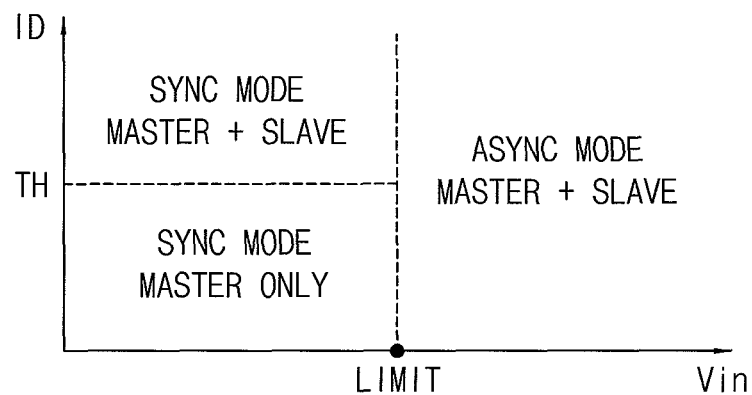
FIG. 11 illustrates an exemplary embodiment of a drive mode of the DC-DC converter of FIG. 2 based on an input power voltage and a driving current.

FIG. 11 illustrates an exemplary embodiment of a drive mode of the DC-DC converter of FIG. 2 based on an input power voltage and a driving current.

Referring to FIGS. 2 to 4 and 11, in an exemplary embodiment, the DC-DC converter 100 may be driven in the synchronous mode SYNC MODE or the asynchronous mode ASYNC MODE according to a magnitude of the input power voltage Vin.

The first converter 110 generally performs a function of boosting the input power voltage Vin. The first converter 110 is desired to output the first power voltage ELVDD of a predetermined magnitude. Therefore, the body diode BD is connected in parallel to the pass transistor MP for voltage drop. In one embodiment, for example, when the input power voltage Vin is greater than a preset boosting voltage limit LIMIT, the display device 1000 may be connected to an external charger to be charged.

In some embodiments, the first converter 110 may be driven in the synchronous mode SYNC MODE when the input power voltage Vin is less than or equal to the boosting voltage limit LIMIT. The current detection operation by the sensor 120 and the drive control operation with respect to the slave inverting converter 150 may be performed in the synchronous mode SYNC MODE.

In such an embodiment, only the master inverting converter 140 may operate when the driving current ID is less than or equal to a threshold TH. Both the master inverting converter 140 and the slave inverting converter 150 may operate when the driving current ID is greater than the threshold TH.

Since the operation and configuration of the second converter 130 in the synchronous mode SYNC MODE are substantially the same as those described above with reference to FIGS. 3 to 10, any repetitive detailed descriptions thereof will be omitted.

In some embodiments, the first converter 110 may be driven in the asynchronous mode ASYNC MODE when the input power voltage Vin exceeds the boosting voltage limit LIMIT. The sensor 120 may not perform the current detection in the asynchronous mode ASYNC MODE. Thus, it may not be determined whether the slave inverting converter 150 is to be driven or not. Accordingly, both the master inverting converter 140 and the slave inverting converter 150 may operate in the asynchronous mode ASYNC MODE.

Figure 12:
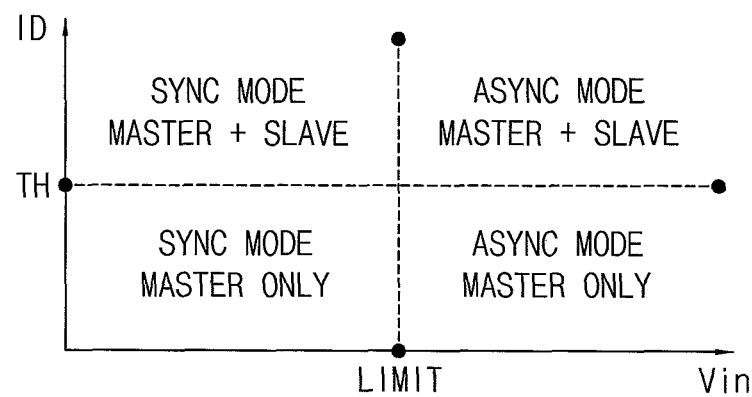
FIG. 12 illustrates an alternative exemplary embodiment of a drive mode of the DC-DC converter of FIG. 2 based on an input power voltage and a driving current.

FIG. 12 illustrates an alternative exemplary embodiment of a drive mode of the DC-DC converter of FIG. 2 based on an input power voltage and a driving current.

Referring to FIG. 12, the current detection operation by the sensor 120 and the drive control operation with respect to the slave inverting converter 150 may be also performed in the asynchronous mode ASYNC MODE.

In such an embodiment, an additional sensor connected to the second convert 130 may be further included in the DC-DC converter. The additional sensor may detect the driving current ID by the second power voltage ELVSS. Therefore, even in the asynchronous mode ASYNC MODE, when the driving current ID is less than or equal to the threshold TH, only the master inverting converter 140 operates. When the driving current ID is greater than the threshold TH, both the master inverting converter 140 and the slave inverting converter 150 may operate.

The exemplary embodiments set forth herein may be applied to any display device including a DC-DC converter and any system including such a display device. Such embodiments may be applied to a television, a computer monitor, a laptop, a digital camera, a cellular phone, a smart phone, a smart pad, a personal digital assistant ("PDA"), a portable multimedia player ("PMP"), a MP3 player, a navigation system, a game console, a video phone, etc., for example.

The foregoing is illustrative of exemplary embodiments, and is not to be construed as limiting thereof. Although a few exemplary embodiments have been described, those skilled in the art will readily appreciate that many modifications are possible in the exemplary embodiments without materially departing from the novel teachings and advantages of exemplary embodiments. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A DC-DC converter, comprising:
a first converter which converts a first power into a first power voltage and outputs the first power voltage to a first output, wherein the first converter comprises:
a first inductor coupled between an input power and a first node;
an inductor charge transistor coupled between the first node and a ground;
a pass transistor coupled between the first node and the first output; and
a body diode connected in parallel to the pass transistor;
a sensor coupled between both ends of the pass transistor of the first converter, and which detects a driving current of a load to which the first power voltage is applied;
a second converter which receives an input power voltage from the input power and outputs a second power voltage lower than the first power voltage to a second output, wherein the second converter comprises:
a master inverting converter which outputs the second power voltage independently of the driving current;
a slave inverting converter which outputs the second power voltage when the driving current is greater than a predetermined threshold or when the input power voltage is greater than a predetermined boosting voltage limit; and
an inverting converter controller which controls operations of the master inverting converter and the slave inverting converter to be in a first drive mode, in which only the master inverting converter operates, and a second drive mode, in which both the master and slave inverting converters operate, based on the driving current and the input power voltage.

2. The DC-DC converter of claim 1, wherein the inverting converter controller comprises:
a dual driving controller which compares the driving current with the predetermined threshold, and provides a dual enable signal for driving the slave inverting converter to the slave inverting converter when the driving current is greater than the predetermined threshold;
a pulse width modulation controller which generates a control voltage based on a voltage difference between a feedback voltage generated based on the second power voltage and a reference voltage, and generates a first pulse width modulation signal for the master inverting converter and a second pulse width modulation signal for the slave inverting converter based on the control voltage; and
a shedding controller which activates a shedding period during which a change speed of a inductor current of the second converter is lowered when a drive mode changes from the first drive mode to the second drive mode or from the second drive mode to the first drive mode.

3. The DC-DC converter of claim 2, wherein the sensor comprises:
a detector coupled between the both ends of the pass transistor and which detects the inductor current flowing through the pass transistor from the first inductor as the driving current by a current mirror when the pass transistor is turned on; and
an output circuit which averages the driving current to a voltage value using a capacitor to generate a load voltage corresponding to the driving current.

4. The DC-DC converter of claim 2, wherein each of the master inverting converter and the slave inverting converter comprises:
a switch circuit including a first switch transistor coupled between the input power and a second node, a second switch transistor coupled between the second node and the second output, and a second inductor coupled between the second node and the ground, wherein the first and second switch transistors are alternately turned on to convert the input power voltage to the second power voltage; and
a switch controller which receives the pulse width modulation signal from the pulse width modulation controller and controls an on/off operation of the first and the second switch transistors based on the pulse width modulation signal.

5. The DC-DC converter of claim 4, wherein the shedding controller gradually changes a gate voltage of the first switch transistor of each of the master inverting converter and the slave inverting converter during the shedding period.

6. The DC-DC converter of claim 4, wherein the shedding controller gradually changes the reference voltage of the pulse width modulation controller during the shedding period.

7. The DC-DC converter of claim 2, wherein the inverting converter controller determines a first threshold as the predetermined threshold in the first drive mode and determines a second threshold lower than the first threshold as the predetermined threshold in the second drive mode.

8. The DC-DC converter of claim 2, wherein the first converter is driven in a synchronous mode, in which the pass transistor operates together with the inductor charge transistor to output the first power voltage, when the input power voltage is less than or equal to the boosting voltage limit.

9. The DC-DC converter of claim 8, wherein the first converter is driven in an asynchronous mode, in which the body diode operates in place of the pass transistor to output the first power voltage, when the input power voltage is greater than the boosting voltage limit.

10. The DC-DC converter of claim 9, wherein
the sensor does not operate in the asynchronous mode, and
both the master inverting converter and the slave inverting converter operate in the asynchronous mode.

11. The DC-DC converter of claim 2, wherein the first pulse width modulation signal and the second pulse width modulation signal have a phase difference of about 180 degrees with each other in the second drive mode.

12. The DC-DC converter of claim 11, wherein a frequency of the first and second pulse width modulation signals in the second drive mode is substantially half a frequency of the first pulse width modulation signal in the first drive mode.

13. A display device, comprising:
a display panel including a plurality of pixels;
a gate driver which provides a gate signal to the display panel;
a data driver which provides a data signal to the display panel;
a DC-DC converter which provides a first power voltage and a second power voltage lower than the first power voltage to the display panel; and a timing controller which controls the gate driver, the data driver, and the DC-DC converter, wherein the DC-DC converter comprises:
- a first converter which outputs the first power voltage using one of a pass transistor and a body diode connected in parallel to the pass transistor based on a magnitude of an input power voltage;
- a sensor coupled between the pass transistor and which detects a driving current flowing into the display panel; and
- a second converter which outputs the second power voltage comprising:
    - a master inverting converter which outputs the second power voltage independently of the driving current;
    - a slave inverting converter which outputs the second power voltage when the driving current is greater than a predetermined threshold or when the input power voltage is greater than a predetermined boosting voltage limit; and
    - an inverting converter controller which controls operations of the master inverting converter and the slave inverting converter to be in a first drive mode, in which only the master inverting converter operates, and in a second driver mode, in which both the master and slave inverting converters operate, based on the driving current and the input power voltage.

14. The display device of claim 13, wherein the inverting converter controller comprises:
- a dual driving controller which compares the driving current with the predetermined threshold, and provides a dual enable signal for driving the slave inverting converter to the slave inverting converter when the driving current is greater than the predetermined threshold;
- a pulse width modulation controller which generates a control voltage based on a voltage difference between a feedback voltage generated based on the second power voltage and a reference voltage, and generates a first pulse width modulation signal for the master inverting converter and a second pulse width modulation signal for the slave inverting converter based on the control voltage; and
- a shedding controller which activates a shedding period during which a change rate of a inductor current of the second converter is lowered when a drive mode changes from the first drive mode to the second drive mode or from the second drive mode to the first drive mode.

15. The display device of claim 13, wherein the first converter is driven in a synchronous mode, in which the pass transistor operates together with an inductor charge transistor of the first converter to output the first power voltage, when the input power voltage is less than or equal to the boosting voltage limit.

16. The display device of claim 15, wherein the first converter is driven in an asynchronous mode, in which the body diode operates in place of the pass transistor to output the first power voltage, when the input power voltage is greater than the boosting voltage limit.

17. The display device of claim 16, wherein
the sensor does not operate in the asynchronous mode, and
both the master inverting converter and the slave inverting converter operate in the asynchronous mode.

18. The display device of claim 13, wherein
the display panel displays a black image during a predetermined start-up period, when the display device is started, and
the second converter drives only the master inverting converter during the start-up period.

19. A display device, comprising:
a display panel including a plurality of pixels;
a gate driver which provides a gate signal to the display panel;
a data driver which provides a data signal to the display panel;
a DC-DC converter which provides a first power voltage and a second power voltage lower than the first power voltage to the display panel; and
a timing controller which controls the gate driver, the data driver, and the DC-DC converter,
wherein the DC-DC converter comprises:
- a first converter which outputs the first power voltage using one of a pass transistor and a body diode connected in parallel to the pass transistor based on a magnitude of an input power voltage;
- a sensor coupled between the pass transistor and which detects a driving current flowing into the display panel; and
- a second converter which outputs the second power voltage comprising:
a master inverting converter which outputs the second power voltage independently of the driving current; and
a slave inverting converter which outputs the second power voltage when the driving current is greater than a predetermined threshold or when the input power voltage is greater than a predetermined boosting voltage limit,
wherein the sensor comprises:
- a detector coupled between the both ends of the pass transistor and which detects the inductor current flowing through the pass transistor from the first inductor as the driving current by a current mirror when the pass transistor is turned on; and
- an output circuit which averages the driving current to a voltage value using a capacitor to generate a load voltage corresponding to the driving current.

* * * * *